US012415286B1

(12) United States Patent
Novak et al.

(10) Patent No.: US 12,415,286 B1
(45) Date of Patent: Sep. 16, 2025

(54) KNIFE LOCK

(71) Applicants: Tomaz Novak, Seneca, SC (US); Jeffrey S. Randall, Gallant, AL (US); Michael B. Alford, Poolville, TX (US)

(72) Inventors: Tomaz Novak, Seneca, SC (US); Jeffrey S. Randall, Gallant, AL (US); Michael B. Alford, Poolville, TX (US)

(73) Assignee: TransEquatorial Solutions Inc., Gallant, AL (US)

( * ) Notice: Subject to any disclaimer, the term of this patent is extended or adjusted under 35 U.S.C. 154(b) by 288 days.

(21) Appl. No.: 18/329,340

(22) Filed: Jun. 5, 2023

Related U.S. Application Data

(63) Continuation-in-part of application No. 17/410,979, filed on Aug. 24, 2021, now Pat. No. 11,673,280.

(60) Provisional application No. 63/348,798, filed on Jun. 3, 2022, provisional application No. 63/069,679, filed on Aug. 24, 2020.

(51) Int. Cl.
*B26B 1/04* (2006.01)

(52) U.S. Cl.
CPC .................................... *B26B 1/04* (2013.01)

(58) Field of Classification Search
CPC ..... B26B 1/00; B26B 1/04; B26B 1/042–046; B26B 1/048
See application file for complete search history.

(56) References Cited

U.S. PATENT DOCUMENTS

| | | | | |
|---|---|---|---|---|
| 7,748,122 | B2 * | 7/2010 | Duey | B26B 1/048 30/159 |
| 10,695,920 | B2 * | 6/2020 | Bruhns | B26B 1/044 |
| 11,123,884 | B1 * | 9/2021 | Mollick | B26B 1/048 |
| 11,820,028 | B2 * | 11/2023 | Makari | B26B 1/044 |
| 2003/0070299 | A1 * | 4/2003 | Frazer | B26B 1/048 30/160 |
| 2009/0277015 | A1 * | 11/2009 | Duey | B26B 1/046 30/158 |
| 2015/0239134 | A1 * | 8/2015 | Duey | B26B 1/06 30/159 |
| 2021/0197410 | A1 * | 7/2021 | Busse | B26B 1/042 |
| 2022/0410415 | A1 * | 12/2022 | Douglas | B26B 1/048 |

* cited by examiner

*Primary Examiner* — Adam J Eiseman
*Assistant Examiner* — Richard D Crosby, Jr.
(74) *Attorney, Agent, or Firm* — Lightfoot & Alford PLLC

(57) ABSTRACT

A folding knife has a frame and a blade pivotable relative to the frame about a fold axis between an open position and a closed position. A toggle coupled to the frame and pivotable relative to the frame about a toggle axis is configured for selectively locking the blade in the open position. A cantilever spring has a free end configured to selectively retain the toggle in a selected position.

20 Claims, 13 Drawing Sheets

KNIFE LOCK

CROSS-REFERENCE TO RELATED APPLICATIONS

This application is a Continuation-in-Part of U.S. Ser. No. 17/410,979, filed 24 Aug. 2021, and claims priority to U.S. 63/069,679, filed 24 Aug. 2020, and to U.S. 63/348,798, filed 3 Jun. 2022, the disclosures of all related applications being incorporated by reference in their entirety.

DETAILED DESCRIPTION

Figure 1:
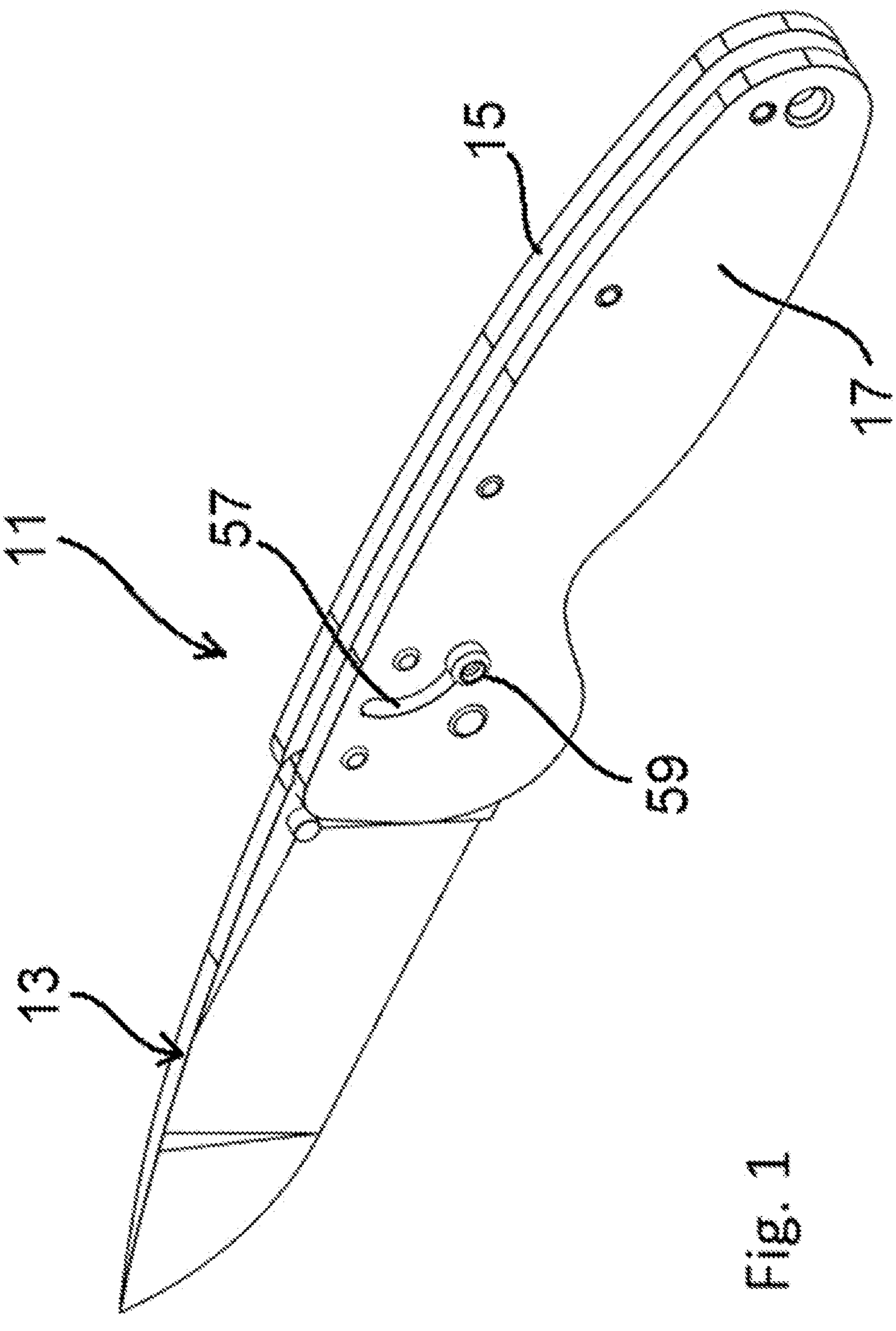
FIG. 1 is an oblique view of a knife with an embodiment of a lock according to this disclosure.

In the specification, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure divulges a new type of knife lock that incorporates an extended, secondary lock area, requiring additional motion before the blade is allowed to close.

FIGS. 1 through 4 illustrate a folding knife 11 that incorporates an embodiment of a lock according to this disclosure. Knife 11 comprises a pivotable blade 13, handles 15, 17, and a toggle 19 housed between handles 15, 17.

Figure 2:
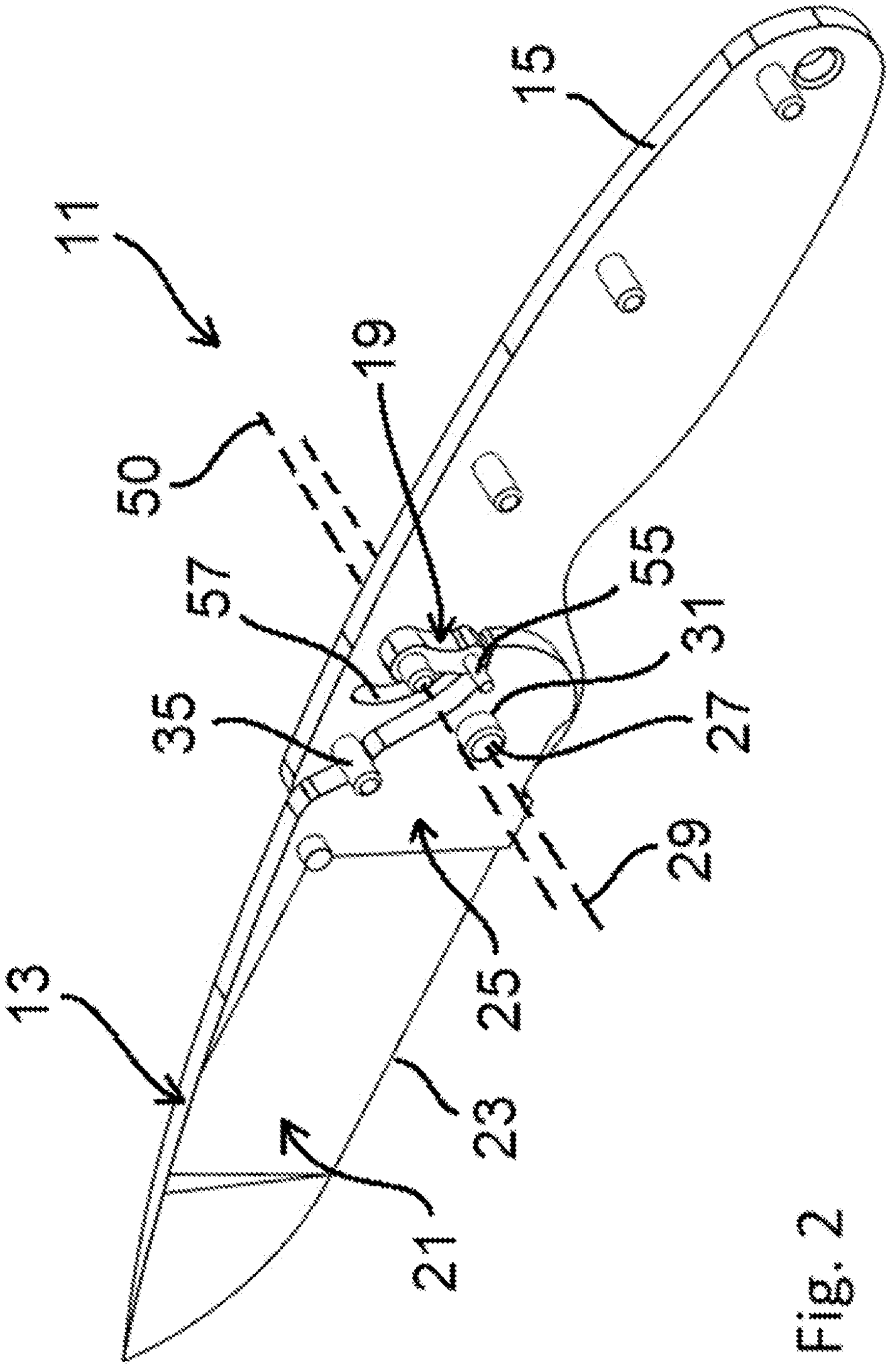
FIG. 2 is an oblique view of the knife of FIG. 1 with components removed for ease of viewing.
Figure 3:
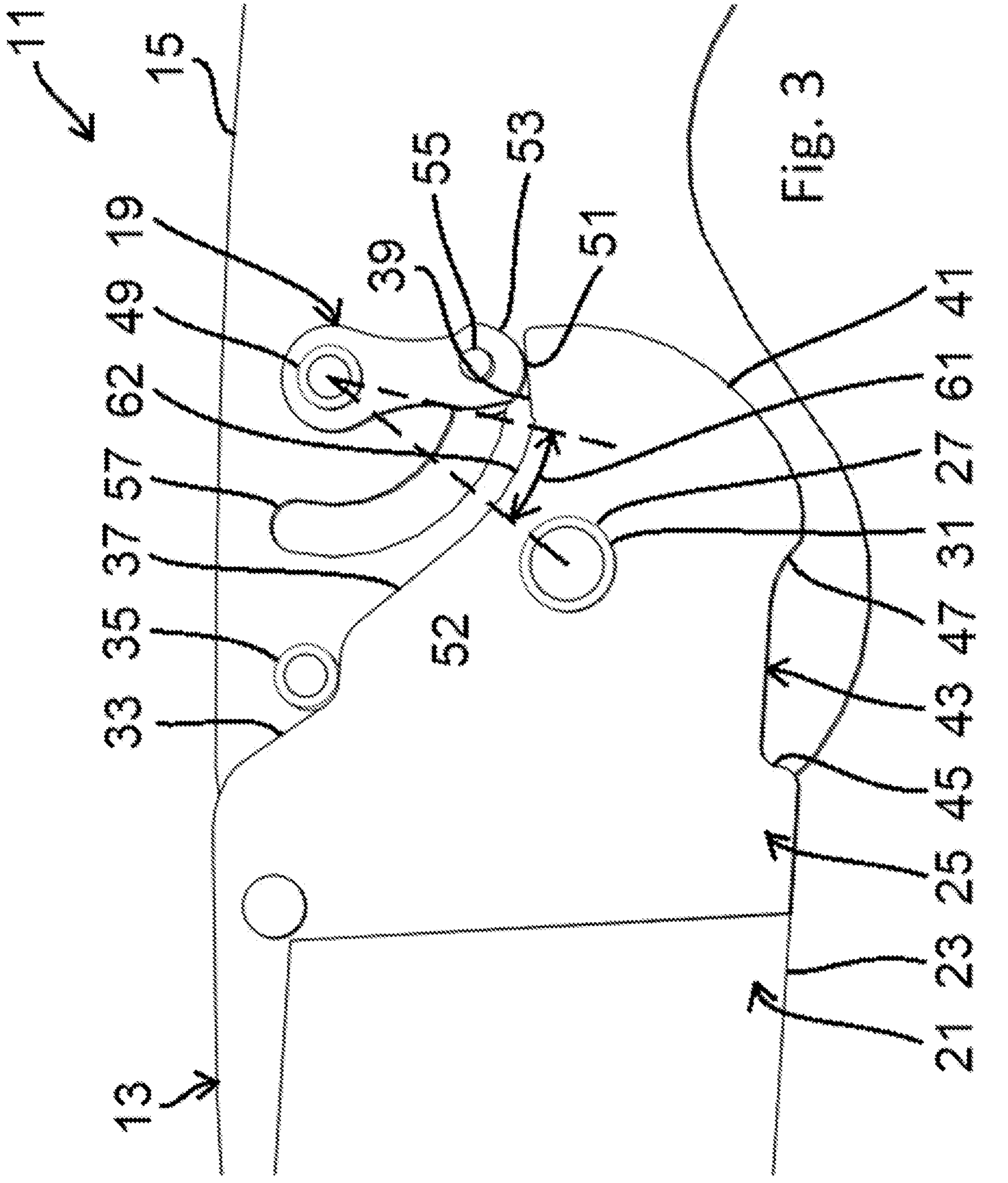
FIG. 3 is a side detail view of the lock of FIG. 1 with a blade of the knife in an open position.
Figure 4:
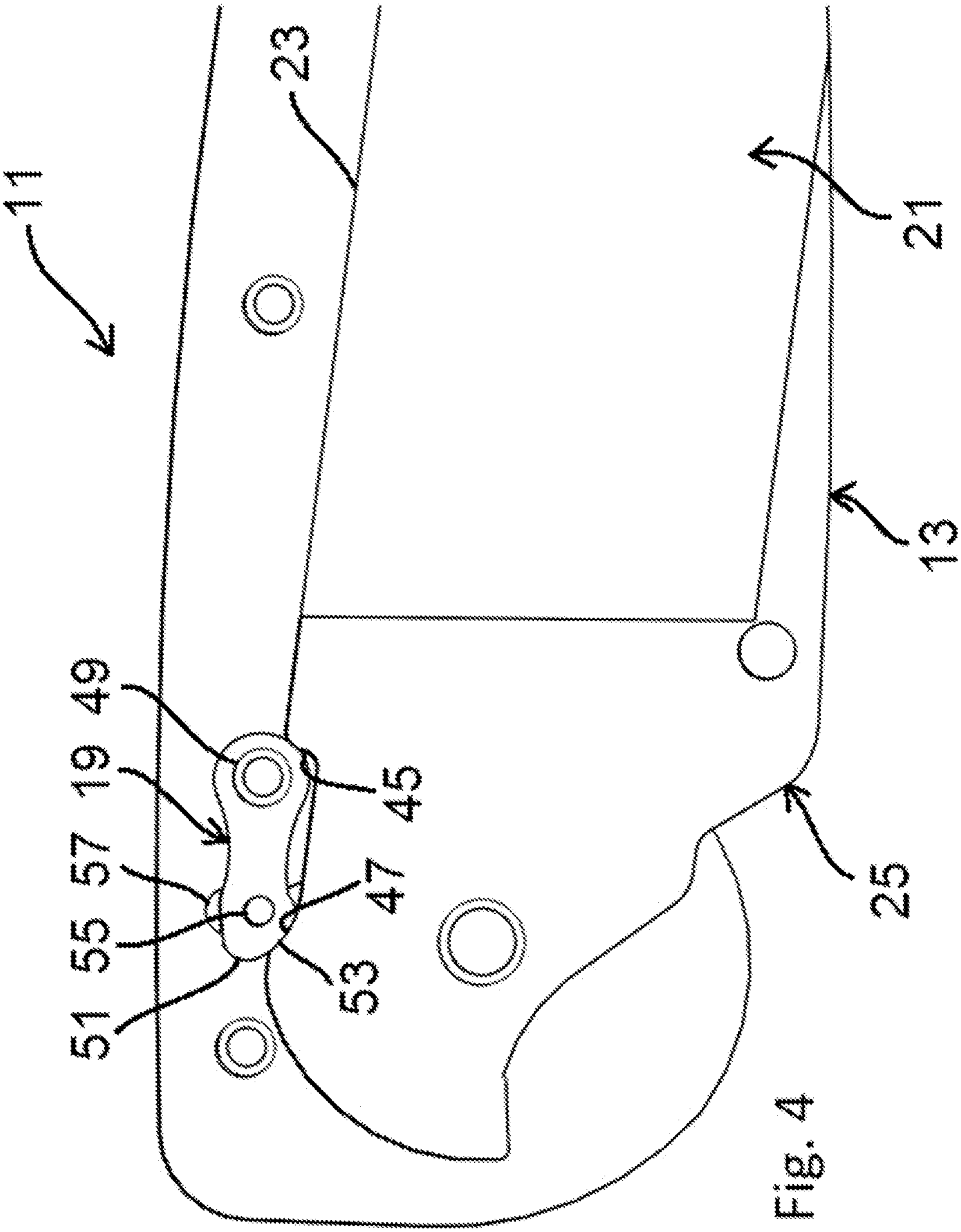
FIG. 4 is a side detail view of the lock of FIG. 1 with a blade of the knife in a closed position.

Knife 11 is designed to allow blade 13 to rotate between an open position, shown in FIGS. 1 through 3, and a closed position, as shown in FIG. 4. Blade 13 comprises a working portion 21 with sharpened edge 23 and a tang 25, and blade 13 is pivotable about blade pivot pin 27 on fold axis 29, pivot pin 27 extending through hole 31 formed in tang 25. In the closed position, edge 23 is located between handles 15, 17. Tang 25 comprises a stop pin surface 33 configured for engaging a stop pin 35 located between handles 15, 17 and used to prevent further rotation of blade 13 when blade 13 is moved to the open position. Tang 25 also comprises a clearance surface 37, a primary lock face 39, radial surface 41, and a recess 43 for receiving toggle 19 when blade 13 is in the closed position. Recess 43 has stop face 45 on one end and lock face 47 on the opposite end. Primary lock face 39 of tang 25 is located on the opposite side of fold axis 29 from working portion 21, and the forward end of face 39 is spaced a radial distance from fold axis 29.

Figure 8:
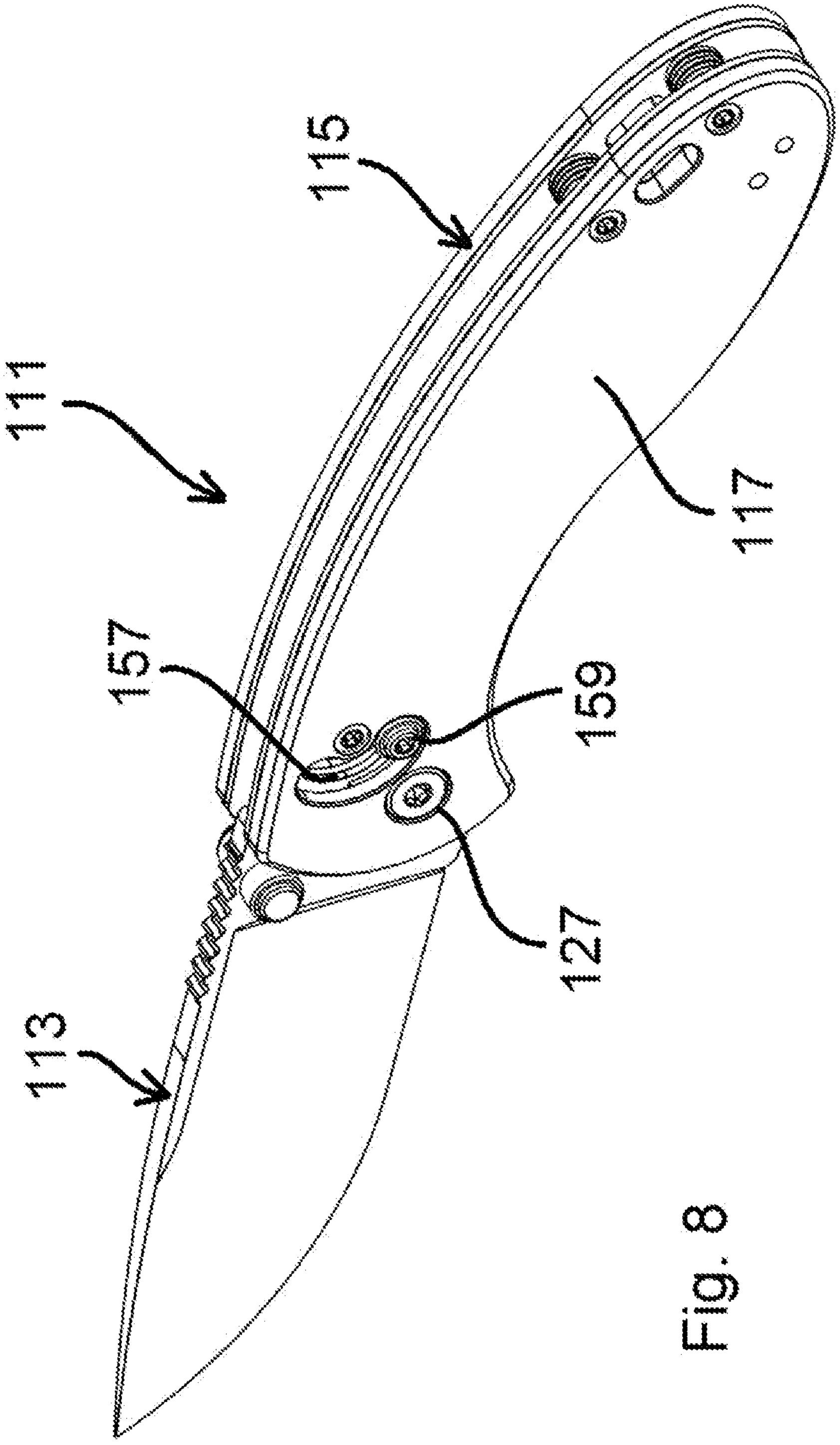
FIG. 8 is an oblique view of a knife with an embodiment of a toggle retention plate according to this disclosure.
Figure 9:
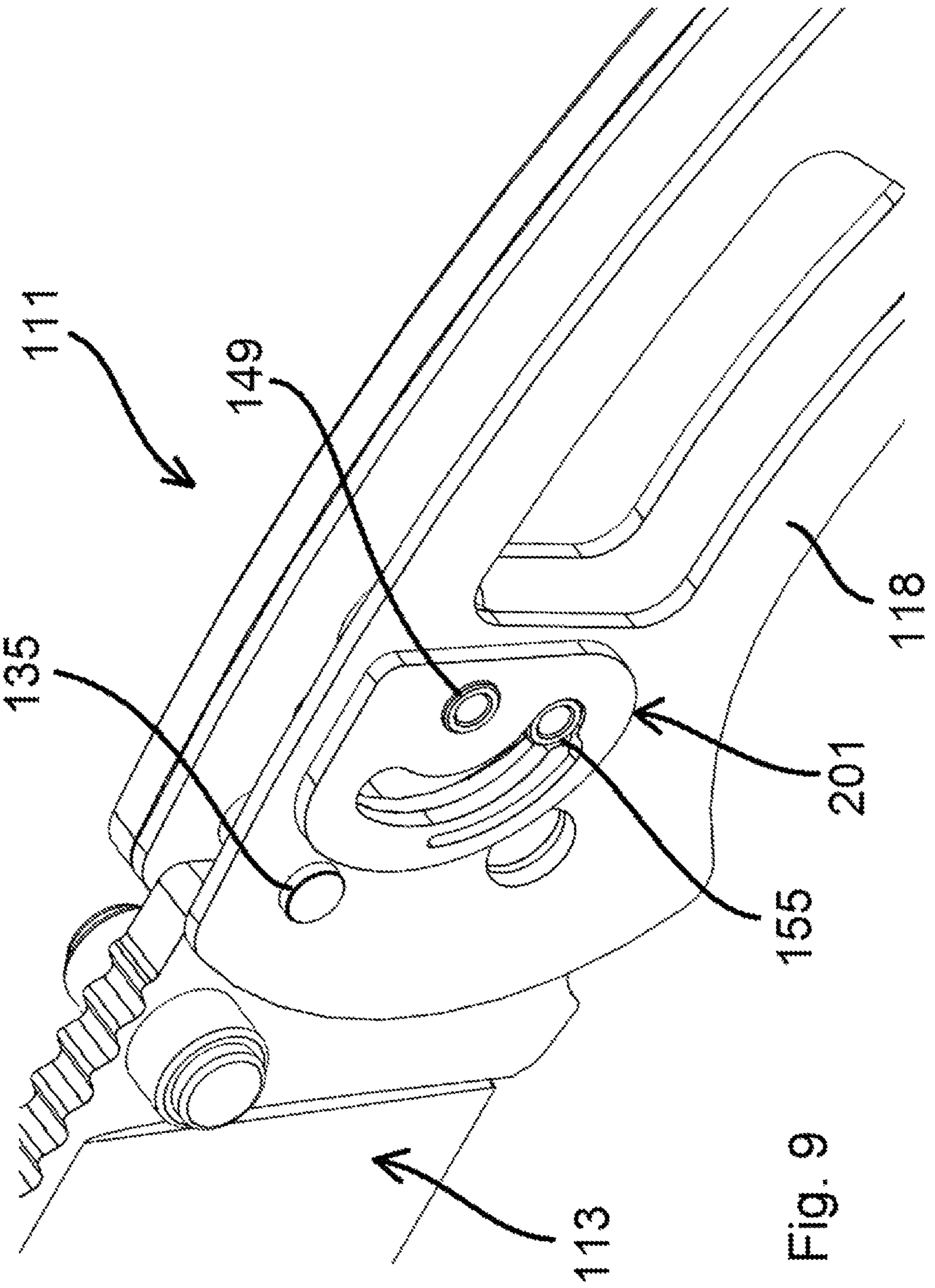
FIG. 9 is an oblique view of the knife of FIG. 8 with components removed for ease of viewing.

In the embodiment shown, toggle 19 has a figure-8 shape and rotates at a pivot end on pivot pin 49 about toggle axis 50, which is spaced a radial distance from fold axis 29. A free end of toggle 19 comprises an open lock face 51, which is configured to engage primary lock face 39 when blade 13 is in the open position, and a closed lock face 53, which is configured to engage lock face 47 of tang 25 when blade 13 is in the closed position. A thumb stud 55 extends from at least one side of the free end and through an arcuate slot 57 formed in an adjacent handle 15, 17. In some embodiments, thumb studs 55 will extend from opposing sides of toggle 19 to allow for ambidextrous operation. A cap 59 may be installed on an outer end of each thumb stud 55 on an exterior of each handle 15, 17.

When blade 13 is in the open position shown in FIG. 3, stop pin surface 33 engages stop pin 35, preventing further rotation of blade 13. Also, the free end of toggle is rotated rearward, so that open lock face 51 engages primary lock face 39, preventing blade 13 from rotating away from the open position. Toggle 19 is biased by a spring or other device toward the position shown in FIG. 3 and to the rearward extent of slots 57. Primary lock face 39 may be formed with an angle, as shown, to allow for continued proper locking through additional rearward rotation of toggle 19 after wear occurs on lock face 39 of tang 25 or lock face 51 of toggle 19.

A secondary lock zone 61 is the angle between a forward end of primary lock face 39 and a plane 52 defined by fold axis 29 of blade 13 and toggle axis 50 of toggle 19. In preferred embodiments, the angle of lock zone 61 is between 5 and 35 degrees (inclusive). Secondary lock face 62 is the portion of surface 37 in zone 61 and is configured so that, when the free end of toggle 19 is within zone 61, lock face 51 of toggle 19 engages secondary lock face 62 for limiting rotation of blade 13 toward the closed position of FIG. 4. The biasing force on toggle 19 causes toggle 19 to rotate back toward the locked position of FIG. 3 if the user removes closing force applied to blade 13 and/or forward force applied to thumb studs 55.

To close blade 13, a user must apply sufficient forward pressure on thumb stud 55 to rotate toggle 19 to where lock face 51 is moved out of zone 61 and to the other side of plane 52, so that lock face 51 will not engage secondary lock face 62. This allows blade 13 to be rotated toward the closed position and for the remainder of clearance surface 37 and radial surface 41 to cause the free end of toggle 19 to rotate forward and upward toward the position shown in FIG. 4. In this closed position, blade 13 is prevented from further rotation by the contact of stop face 45 and the pivot end of toggle 19. In this embodiment, lock face 53 of toggle 19 engages lock face 47 of tang 25, preventing blade 13 from rotating away from the closed position and requiring the user to apply upward force to thumb studs 55 to disengage toggle 19 from blade 13.

Toggle 19 is shown with a figure-8, or "dog bone," configuration, but toggle 19 may have other shapes, including configurations with linear features. While shown as having thumb studs 55 protruding from toggle 19 and out of handles 15, 17, alternative embodiments can include recessed features that do not protrude from handles 15, 17, such as, for example, a dished area. Other alternative embodiments incorporate alternative toggle designs, links, levers, and/or similar components for actuating toggle 19, including versions that allow for reversing the direction of movement for unlocking toggle 19.

Figure 5:
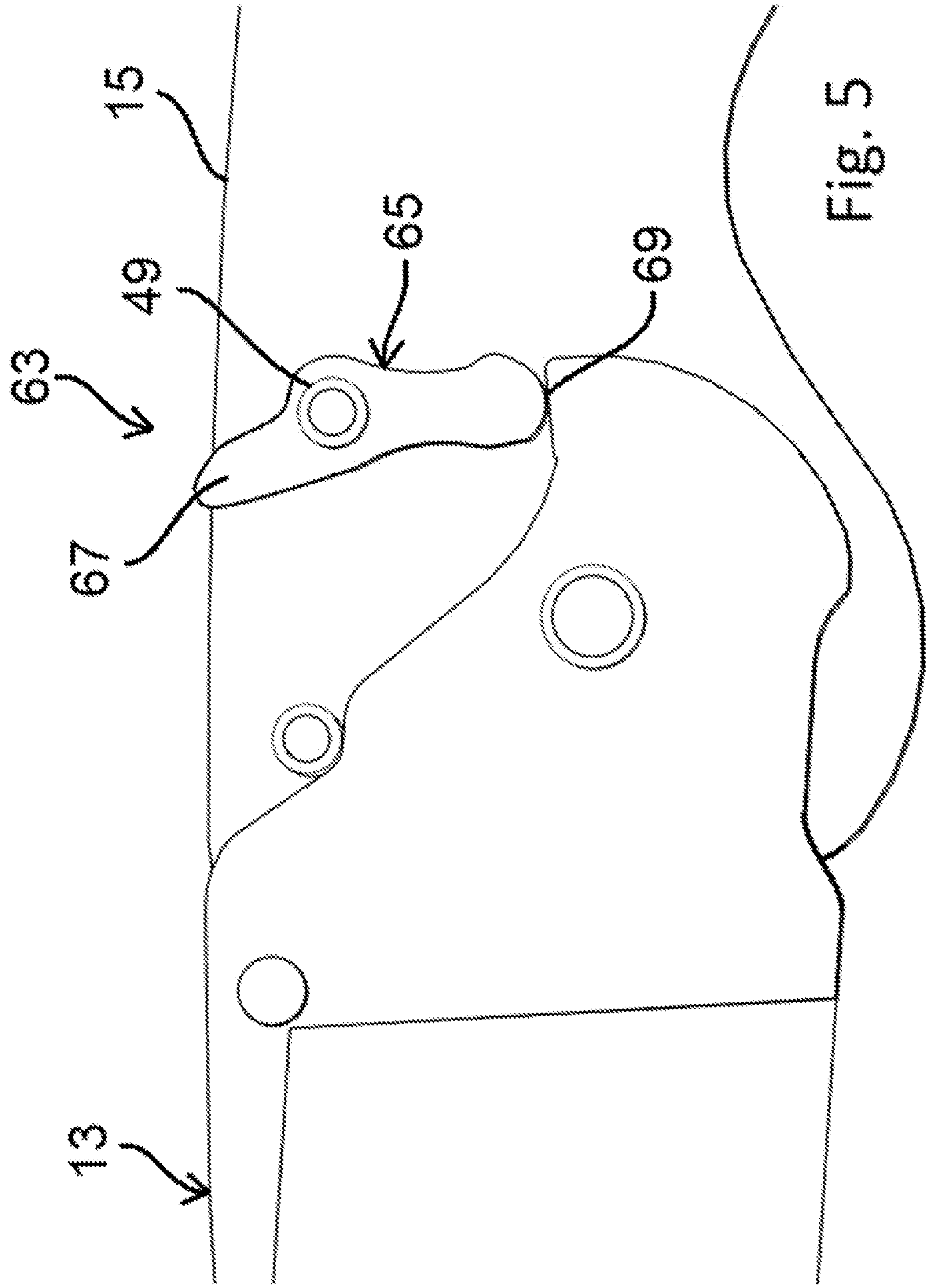
FIG. 5 is a side detail view of an alternative embodiment of a lock according to this disclosure.

For example, FIG. 5 illustrates an alternative embodiment, in which knife 63 comprises toggle 65. Toggle 65 is configured similarly to toggle 19, as described above, although toggle 65 lacks thumb studs 55 and incorporates a thumb lever 67 located on the end of toggle 65 opposite lock face 69. The outer end of lever 67 protrudes beyond the upper edge of handles 15,17 (17 not shown), both lacking slots 57. This allows a user to pull rearward on lever 67 to rotate toggle 65 and unlock blade 13.

Figure 6:
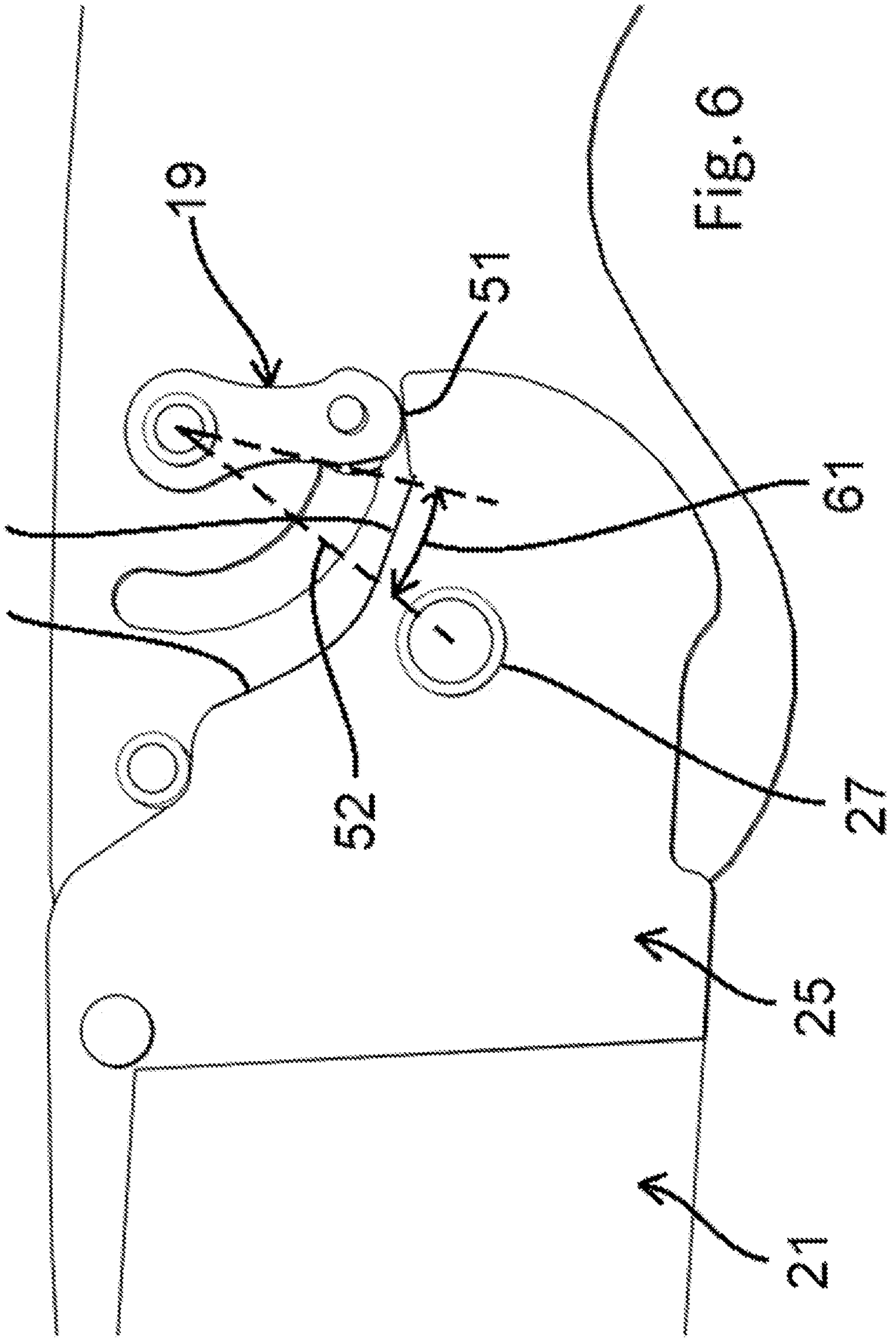
FIG. 6 is a side detail view of another alternative embodiment of a lock according to this disclosure.
Figure 7:
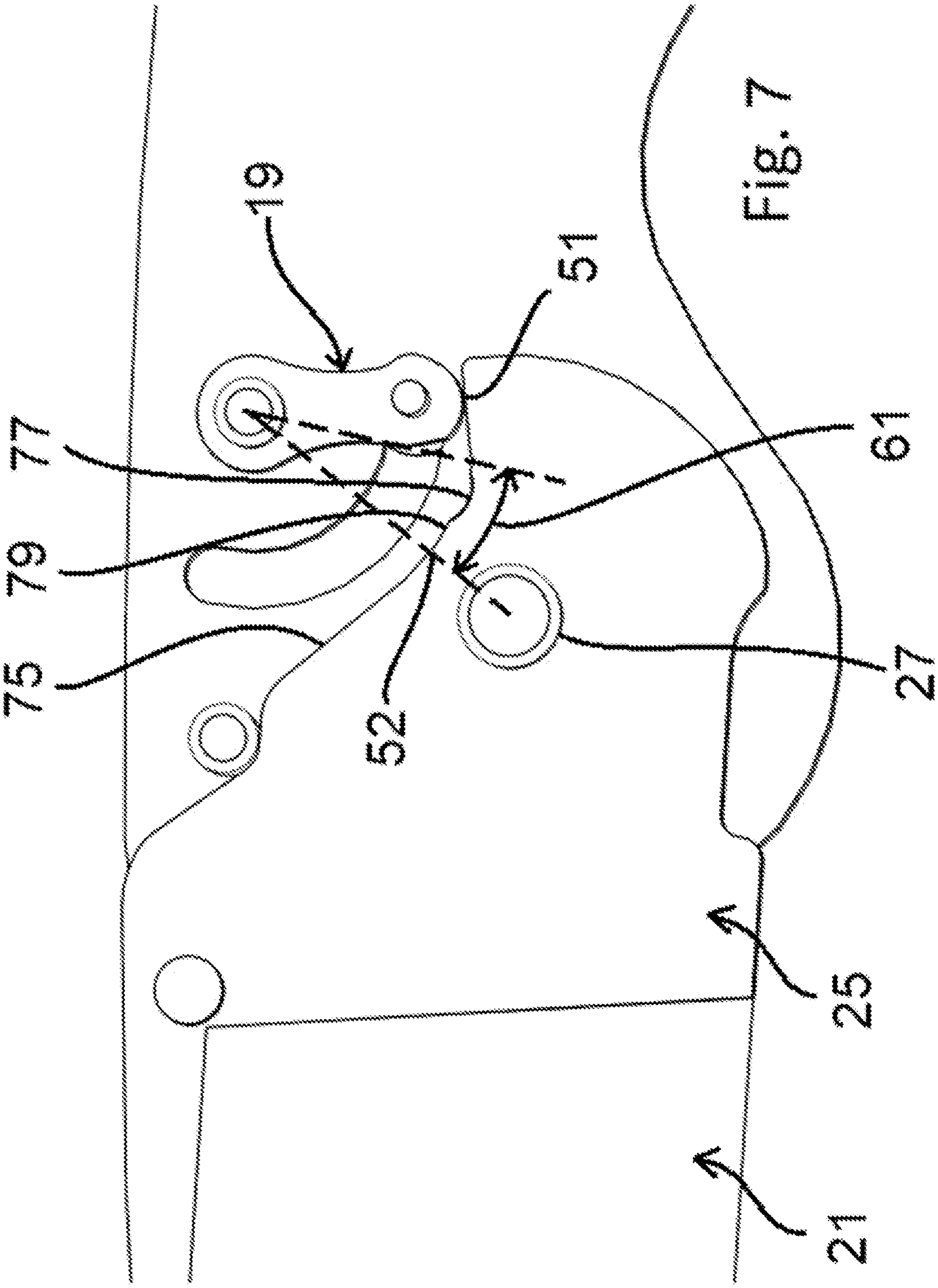
FIG. 7 is a side detail view of another alternative embodiment of a lock according to this disclosure.

FIGS. 6 and 7 illustrate alternative embodiments of the lock according to this disclosure. In FIG. 6, clearance surface 71 comprises a planar secondary lock face 73 configured to engage lock face 51 when face 51 is within zone 61. In FIG. 7, clearance surface 75 is configured like surface 37 but also comprises a female relief 77, or divot, in secondary lock face 79 that is configured to receive lock face 51 when aligned with relief 77. Relief 77 provides a positive stop during unintentional rotation of the free end of toggle 19 toward fold axis 29.

FIGS. 8 through 11 illustrate knife 111, which is constructed similarly to knife 11, as described above, and components thereof. Knife 111 comprises a toggle lock like that of knife 11, and like components have corresponding numbers. In addition, knife 111 also comprises an embodiment of a toggle retention plate 201 according to this disclosure.

Knife 111 comprises a pivotable blade 113, handles 115, 117 coupled to frame 118 in this embodiment, and a toggle 119 pivotally carried in frame 118. Blade 113 is rotatable about blade pivot pin 127, and stop pin 135 limits rotation of blade 113 when blade 113 is moved to the open position, as shown. Toggle 119 rotates at a pivot end on pivot pin 149, and a free end of toggle 119 comprises a stud 155 that extends from at least one side of the free end and through an arcuate slot 157 formed in an adjacent handle 115, 117 and frame 118. In the embodiment shown, studs 155 extend from opposing sides of toggle 119 to allow for ambidextrous operation. A cap 159 is installed on an outer end of each stud 155 on an exterior of each handle 115, 117.

In addition to the friction of the engaged faces of the lock when blade 113 is in the open position, as described above and shown in detail in FIG. 3, retention plate 201 provides an additional means for retaining toggle 119 in the locked position. Plate 201 has a planar body 203 having an aperture 205 sized for receiving pivot pin 149. Aperture 207 is formed in body 203 to allow stud 155 to freely move within aperture 207, which is shown as an arcuate slot generally corresponding to the shape and length of slot 157. Aperture 209 is formed in body 203 on the other side of aperture 207 from aperture 205 and is shown as an arcuate slot. A retention spring 211 is formed as a cantilever beam between aperture 209 and aperture 207, aperture 209 being shown as generally following the curvature of aperture 207 and extending for a least a portion of the length of aperture 207 from near locked-position end 213 of aperture 207. Aperture 209 intersects aperture 207 to form a free end 215 of spring 211, with free end 215 having a width that forms a narrowed region in aperture 207. Aperture 209 may have different curvature than aperture 207, thereby forming spring 211 in a desired shape and allowing for tuning of the characteristics of spring 211, such as a spring rate. The motion of each stud 155 is defined by the distance of studs 155 from toggle axis of toggle 119, so apertures 207, 209 may have alternative shapes from the arcuate slots shown in the figures. For example, aperture 207 may have a contour that defines a larger area, such as that shown with broken lines 217 in FIG. 11. Also, apertures 207, 209 may define a less curved or straight spring.

Figure 10:
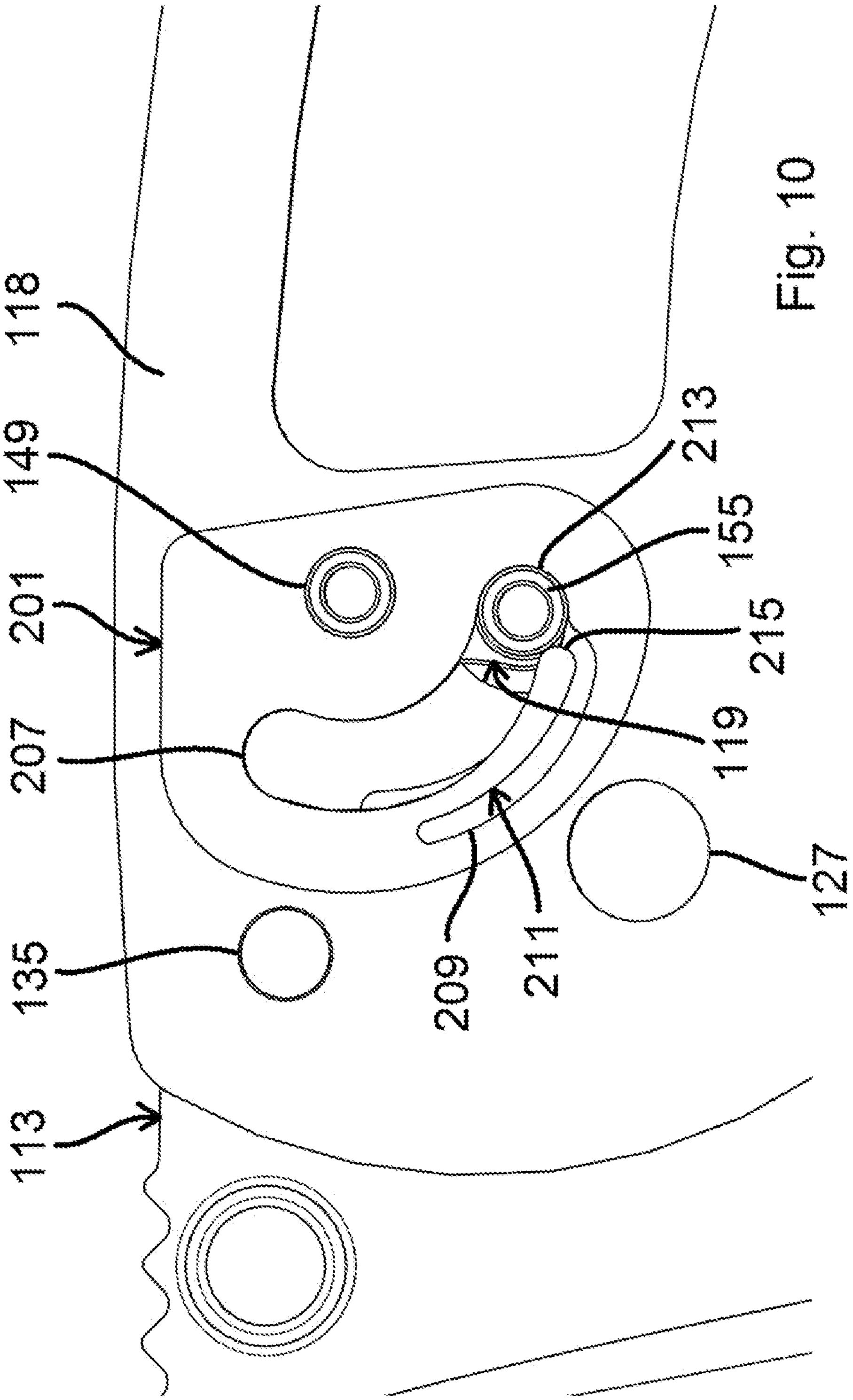
FIG. 10 is an enlarged side view of a portion of the knife of FIG. 8.
Figure 11:
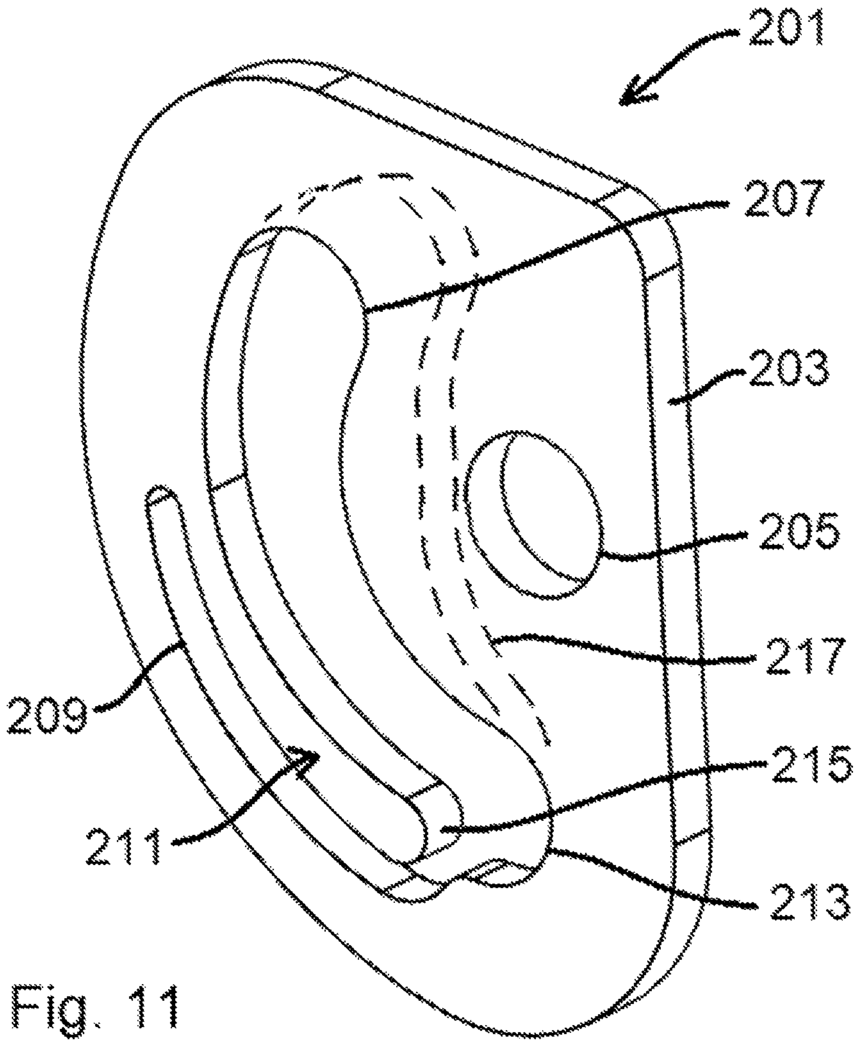
FIG. 11 is an oblique view of the lock retention plate of FIG. 8.

As best shown in FIG. 10, retention plate 201 is installed on frame 118 with aperture 207 generally aligned with slot 157, allowing stud 155 to travel within aperture 207 as toggle 119 is pivoted about pivot pin 149. As toggle 119 is moved within aperture 207 to the locked position, as shown, stud 155 deforms spring 211 toward aperture 209, allowing stud 155 to move past the narrowed portion of aperture 207 and into locked-position end 213 of aperture 207. A portion of free end 215 of spring 211 then engages stud 155 for retaining toggle 119 in the locked position. To release toggle 119 for folding blade 113, a user must apply sufficient pressure to stud 155 to overcome the bias of spring 211 and deform spring 211, thereby allowing stud 155 to move in aperture 207 away from locked-position end 213.

In the embodiment shown, two retention plates 201 are installed, with one located on each side of frame 118, though other embodiments may have only one plate 201 installed. Also, it should be noted that aperture 209 may be formed on either side of aperture 207.

Figure 12:
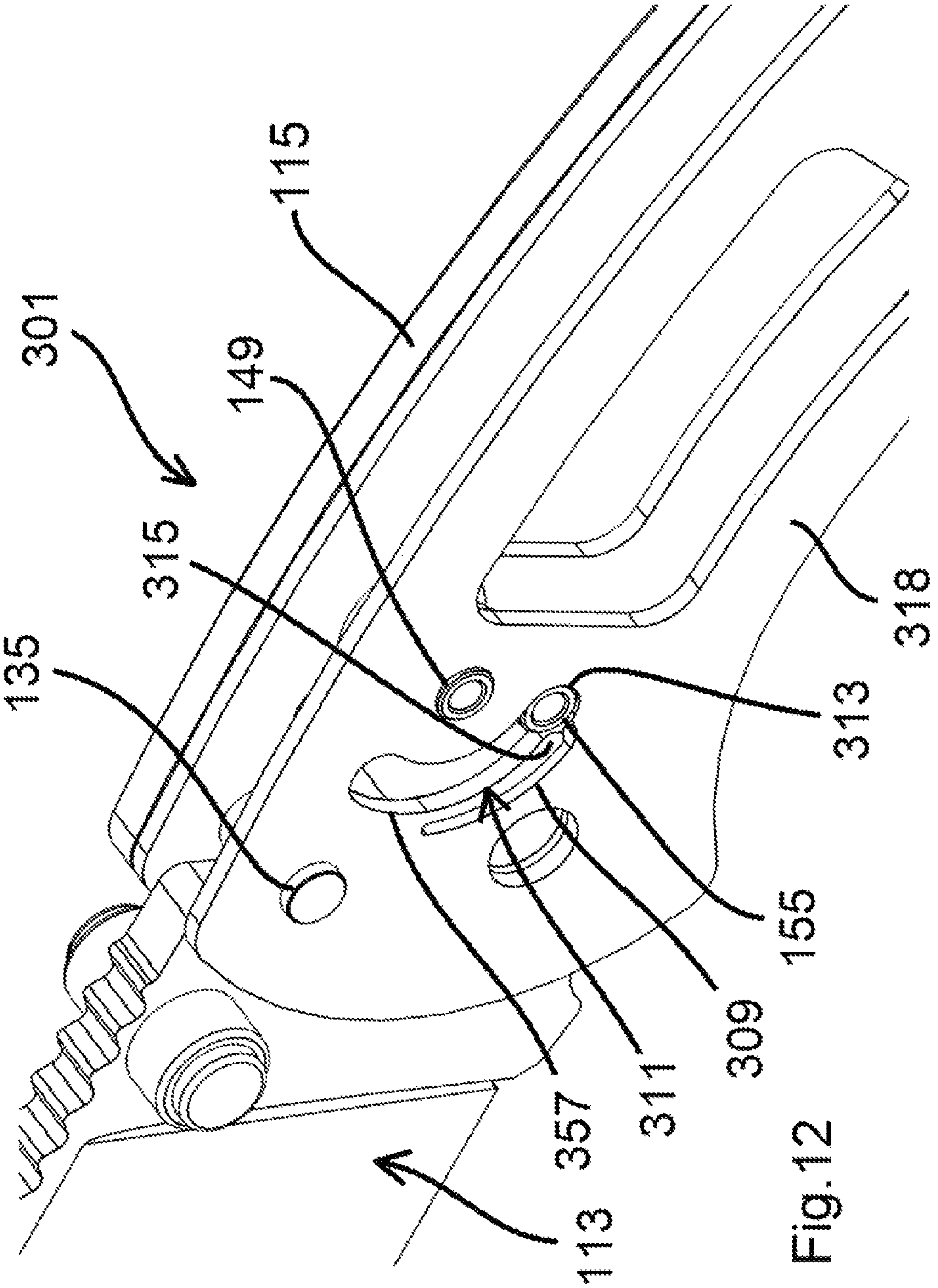
FIG. 12 is an oblique view of a knife with an embodiment of a lock and toggle retention spring according to this disclosure.

Referring to FIG. 12, knife 301 comprises a lock similar to those described above and an alternative embodiment of toggle retention lock according to this disclosure. Knife 301 comprises a pivotable blade 113 and a toggle pivotally carried in frame 318. Blade 113 is rotatable relative to frame 318, and stop pin 135 limits rotation of blade 113 when blade 113 is moved to the open position, as shown. The toggle rotates at a pivot end on pivot pin 149, and a free end of the toggle comprises a stud 155 that extends from at least one side of the free end and through an arcuate slot 357 formed in frame 318. Instead of using a separate plate, such as plate 201, for a toggle retention lock, the lock features are formed in frame 318. A cantilever spring 311, which is constructed and operated like spring 211, is formed in frame 318 and defined by apertures 309, 357, which are both shown as arcuate slots but may have alternative configurations. Spring 311 has a free end 315 configured for engaging stud 155 when stud 155 is moved to a locked-position end 313 of aperture 357.

Figure 13:
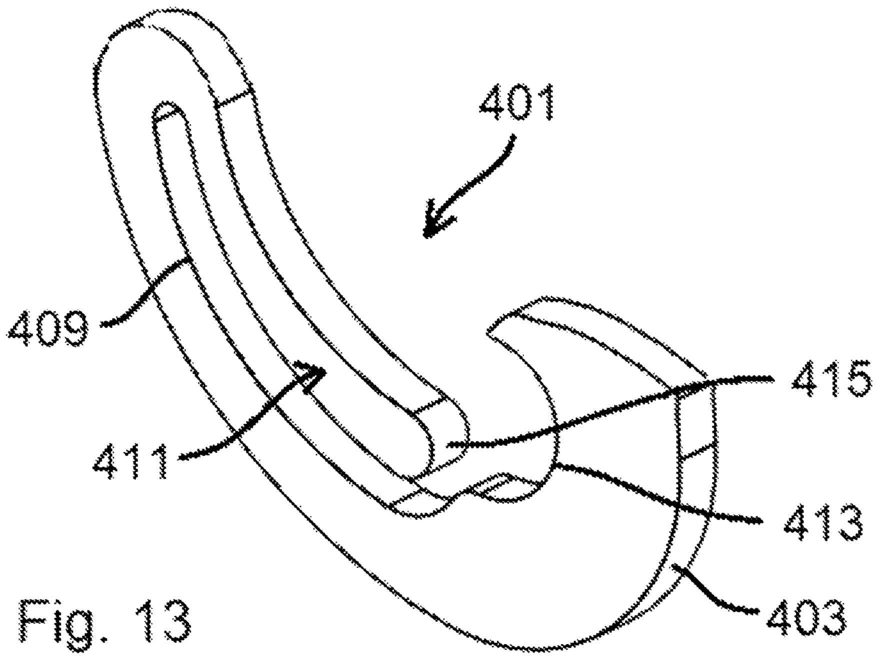
FIG. 13 is an oblique view of an alternative embodiment of a toggle retention plate.

FIG. 13 illustrates another embodiment of a cantilever spring formed as a separate component for coupling to a knife frame. Spring plate 401 has a planar body 403 having an aperture 409 formed in body 203 for defining spring 411, aperture 409 being shown as an arcuate slot. Spring 411 is formed as a cantilever beam with free end 415, which is configured to engage a toggle stud for selectively retaining toggle stud at locked-position opening 413. Aperture 409 may have different a different shape that that shown, thereby forming spring 411 in a desired shape and allowing for tuning of the characteristics of spring 411, such as a spring rate, and aperture 409 may define a less curved or straight spring 411.

It should be noted for each embodiment that the stud may be a separate component coupled to the toggle or be an integral portion of the toggle extending therefrom. Alternatively, toggle may have a recess, dimple, or other feature that the retention spring engages.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that embodiments with and without the element are within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A folding knife, comprising:

a frame;

a blade coupled to the frame and pivotable relative to the frame about a fold axis between an open position and a closed position;

a toggle coupled to the frame and pivotable relative to the frame about a toggle axis, the toggle being configured for selectively locking the blade in the open position; and a cantilever spring having a free end configured to selectively retain the toggle in a selected position.

2. The knife of claim 1, further comprising:

a stud extending from the toggle;

wherein the free end engages the stud for retaining the toggle in the selected position.

3. The knife of claim 1, wherein the spring is formed in the frame.

4. The knife of claim 1, wherein the spring is coupled to the frame.

5. The knife of claim 1, wherein the spring is defined by apertures on each side of the spring.

6. The knife of claim 1, wherein:

the blade has a working portion and a tang;

the toggle axis is located a radial distance from the fold axis, a free end of the toggle having an open lock face located a radial distance from the toggle axis;

the tang has a primary lock face located on the opposite side of the fold axis from the working portion; and when the blade is in the open position, the open lock face engages the primary lock face to prevent rotation of the blade toward the closed position.

7. The knife of claim 6, wherein a forward end of the primary lock face is spaced a radial distance from the fold axis.

8. The knife of claim 6, wherein to allow the blade to pivot to the closed position the free end of the toggle must be rotated through an angle sufficient to move the open lock face from a forward end of the primary lock face to the other side of a plane defined by the fold axis and the toggle axis.

9. The knife of claim 6, further comprising:

a clearance surface on the tang and extending from the primary lock face to beyond a plane defined by the fold axis and toggle axis.

10. The knife of claim 6, further comprising:

a clearance surface on the tang extending from the primary lock face to at least a plane defined by the fold axis and toggle axis;

wherein a secondary lock face is defined as a portion of the clearance surface between a forward end of the primary lock face and the plane, the secondary lock face being configured to engage the open lock face of the toggle when the open lock face is between the primary lock face and the plane.

11. A folding knife, comprising:

a frame;

a blade coupled to the frame and pivotable relative to the frame about a fold axis between an open position and a closed position;

a toggle coupled to the frame and pivotable relative to the frame about a toggle axis, the toggle being configured for selectively locking the blade in the open position; and a cantilever spring formed in the frame and having a free end configured to selectively retain the toggle in a selected position.

12. The knife of claim 11, further comprising:

a stud extending from the toggle;

wherein the free end engages the stud for retaining the toggle in the selected position.

13. The knife of claim 11, wherein the spring is defined by at least one aperture formed in the frame.

14. The knife of claim 11, wherein:

the blade has a working portion and a tang;

the toggle axis is located a radial distance from the fold axis, a free end of the toggle having an open lock face located a radial distance from the toggle axis;

the tang has a primary lock face located on the opposite side of the fold axis from the working portion; and when the blade is in the open position, the open lock face engages the primary lock face to prevent rotation of the blade toward the closed position.

15. The knife of claim 11, wherein to allow the blade to pivot to the closed position the free end of the toggle must be rotated through an angle sufficient to move the open lock face from a forward end of the primary lock face to the other side of a plane defined by the fold axis and the toggle axis.

16. A folding knife, comprising:

a frame;

a blade coupled to the frame and pivotable relative to the frame about a fold axis between an open position and a closed position;

a toggle coupled to the frame and pivotable relative to the frame about a toggle axis, the toggle being configured for selectively locking the blade in the open position; and a cantilever spring coupled to the frame and having a free end configured to selectively retain the toggle in a selected position.

17. The knife of claim 16, further comprising:

a stud extending from the toggle;

wherein the free end engages the stud for retaining the toggle in the selected position.

18. The knife of claim 16, wherein the spring is formed in a plate and defined by at least one aperture formed in the plate.

19. The knife of claim 16, wherein:

the blade has a working portion and a tang;

the toggle axis is located a radial distance from the fold axis, a free end of the toggle having an open lock face located a radial distance from the toggle axis;

the tang has a primary lock face located on the opposite side of the fold axis from the working portion; and when the blade is in the open position, the open lock face engages the primary lock face to prevent rotation of the blade toward the closed position.

20. The knife of claim 16, wherein to allow the blade to pivot to the closed position the free end of the toggle must be rotated through an angle sufficient to move the open lock face from a forward end of the primary lock face to the other side of a plane defined by the fold axis and the toggle axis.

* * * * *